(No Model.)
W. E. BAILEY.
SPLIT LINK.
No. 446,317. Patented Feb. 10, 1891.
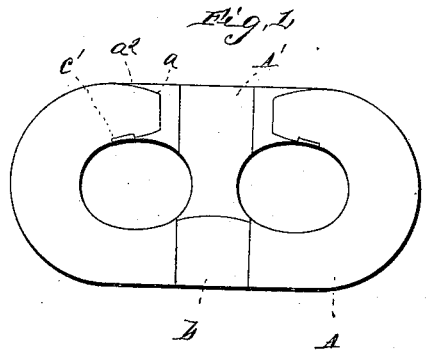
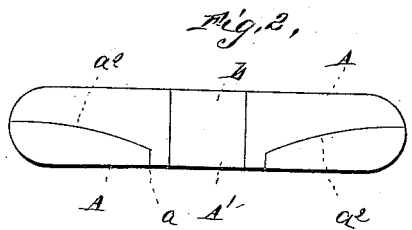
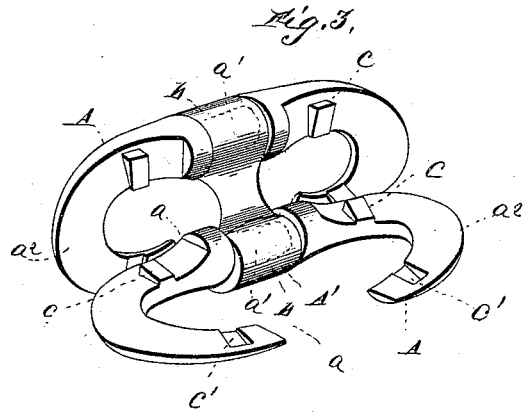
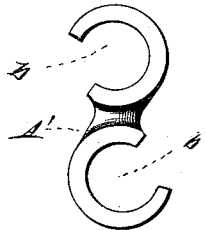
Witnesses
Inventor
Wesley E. Bailey
By E. W. Anderson
his Attorney

UNITED STATES PATENT OFFICE.

WESLEY E. BAILEY, OF DETROIT, MICHIGAN.

SPLIT LINK.

SPECIFICATION forming part of Letters Patent No. 446,317, dated February 10, 1891.

Application filed October 18, 1890. Serial No. 368,539. (No model.)

*To all whom it may concern:*

Be it known that I, WESLEY E. BAILEY, a citizen of the United States, and a resident of Detroit, in the county of Wayne and State of Michigan, have invented certain new and useful Improvements in Split Links; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a plan view. Fig. 2 is a side view. Fig. 3 is a perspective view of the link open. Fig. 4 is a detail view of the coupling.

This invention relates to certain improvements in split links for chains; and it consists in the novel construction and combination of parts, hereinafter disclosed.

In the embodiment of my invention I construct the link principally in two longitudinal sections or parts A A, uniting them by a transverse coupling or connecting piece A'. Each link section or part A has a portion of one side removed providing a lateral opening $a$, the other side of the link immediately opposite this opening having a reduced web-like axial portion $a'$. Directly joining and on each side of said latter portion $a$ the link is cylindrical in cross-section for a slight distance, the rest of its surface conforming in its general contour thereto, except that it is cut or split upon one side obliquely toward its ends or opening $a$, as at $a^2$ $a^2$, the aforesaid construction of the link-sections being reversed side for side. The coupling or connecting-piece A', having the initial form of Fig. 4, and finally assuming, under the action of a swage, the shape disclosed in Fig. 3, connects the link-sections at the middle, having at its ends eyes or apertures $b$ for the passage therethrough of the reduced or axial portions $a'$ of said link-sections, thus permitting the pivoting and turning of the sections upon or in the ends of said coupling in opposite directions or away from each other. Therefore, in order to connect to said link an additional link the two sections of the former are pried apart at diagonally-opposite points simultaneously, thus moving them oppositely from each other, when the insertion or connection of the additional link can be readily effected, its removal being as easily effected by moving it toward the cross-piece or coupling, so as to clear the ends of one or the other of the link-sections and again proceeding as above. The link-sections are provided upon their obliquely split or beveled surfaces with interlocking, oppositely-beveled lugs $c$ $c$ and recesses or sockets $c'$ $c'$, effecting the locking of said link-sections against separation except by prying from both sides of the latter, as above pointed out, thus preventing the accidental spreading of the same.

Having thus fully described my invention, what I claim as new, and desire to secure by Letters Patent, is—

1. The split link having its sections each provided with an opening in one side and on the other side with a reduced axial portion, and obliquely split or beveled toward its ends or said opening, in combination with the transverse coupling or connecting-piece having bearings in or at its ends for said axial portions of the link-sections, substantially as specified.

2. In a split link, the sections thereof axially pivoted together by a transverse coupling having at its ends the oppositely-turned hooks or eyes having bearings for the reduced axial portions of said sections, said sections also having their obliquely split or beveled surfaces provided with interlocking oppositely-beveled lugs and recesses or sockets, substantially as specified.

In testimony whereof I affix my signature in presence of two witnesses.

WESLEY E. BAILEY.

Witnesses:
CHARLES BRUNDAGE,
E. R. PHENIX.